United States Patent
Ohara

(10) Patent No.: US 12,089,266 B2
(45) Date of Patent: Sep. 10, 2024

(54) USER APPARATUS AND BASE STATION APPARATUS

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 223 days.

(21) Appl. No.: 17/286,922

(22) PCT Filed: Nov. 1, 2018

(86) PCT No.: PCT/JP2018/040778
§ 371 (c)(1),
(2) Date: Apr. 20, 2021

(87) PCT Pub. No.: WO2020/090097
PCT Pub. Date: May 7, 2020

(65) Prior Publication Data
US 2021/0378026 A1  Dec. 2, 2021

(51) Int. Cl.
| | |
|---|---|
| H04W 74/08 | (2024.01) |
| H04W 16/28 | (2009.01) |
| H04W 56/00 | (2009.01) |
| H04W 74/02 | (2009.01) |
| H04W 74/0833 | (2024.01) |

(52) U.S. Cl.
CPC ....... *H04W 74/0841* (2013.01); *H04W 16/28* (2013.01); *H04W 56/001* (2013.01); *H04W 74/02* (2013.01)

(58) Field of Classification Search
CPC ............. H04W 74/0841; H04W 74/02; H04W 74/0833; H04W 16/28; H04W 56/001; H04L 5/0023; H04L 5/0048; H04L 5/0053

USPC .................................................. 370/329–330
See application file for complete search history.

(56) References Cited

U.S. PATENT DOCUMENTS

| | | | |
|---|---|---|---|
| 2018/0302889 A1 | 10/2018 | Guo et al. | |
| 2019/0230545 A1* | 7/2019 | Liou | H04W 24/10 |
| 2019/0297603 A1* | 9/2019 | Guo | H04L 5/0051 |
| 2019/0349059 A1* | 11/2019 | John Wilson | H04L 5/0091 |
| 2020/0100154 A1* | 3/2020 | Cirik | H04W 36/305 |
| 2020/0120584 A1* | 4/2020 | Yi | H04W 74/0866 |

(Continued)

OTHER PUBLICATIONS

International Search Report issued in Application No. PCT/JP2018/040778, mailed on Jan. 8, 2019 (3 pages).

(Continued)

*Primary Examiner* — Candal Elpenord
(74) *Attorney, Agent, or Firm* — Osha Bergman Watanabe & Burton LLP

(57) ABSTRACT

A user apparatus includes a control unit configured to determine a spatial reception parameter of a control channel based on QCL (Quasi-co-location) information pertaining to a synchronization signal or a reference signal, and a receiver configured to receive the control channel based on the determined spatial reception parameter, wherein, in a case where a first search space is received during a non-contention based random access procedure, the control unit determines the spatial reception parameter of the first search space based on the QCL information applied when receiving an instruction by the control channel, the instruction triggering the non-contention based random access procedure.

5 Claims, 6 Drawing Sheets

(56) References Cited

U.S. PATENT DOCUMENTS

| | | | |
|---|---|---|---|
| 2021/0045141 A1* | 2/2021 | Lee | H04L 5/0023 |
| 2021/0083751 A1* | 3/2021 | Chen | H04L 25/0226 |
| 2021/0159966 A1* | 5/2021 | Xi | H04L 5/0023 |

OTHER PUBLICATIONS

Written Opinion issued in International Application No. PCT/JP2018/040778, mailed on Jan. 8, 2019 (3 pages).

3GPP TS 38.300 V15.3.0, Release 15; "3rd Generation Partnership Project; Technical Specification Group Radio Access Network; NR; NR and NG-RAN Overall Description; Stage 2;" Sep. 2018; Sophia Antipolis Valbonne, France (92 pages).

3GPP TS 38.211 V15.3.0, Release 15; "3rd Generation Partnership Project; Technical Specification Group Radio Access Network; NR; Physical channels and modulation;" Sep. 2018; Sophia Antipolis Valbonne, France (96 pages).

Office Action in counterpart Japanese Patent Application No. 2020-554722 issued on Dec. 6, 2022 (5 pages).

Vivo; "Remaining issues on simultaneous reception of DL/UL physical channels and RSs"; 3GPP TSG RAN WG1 Meeting #94, R1-1808223; Gothenburg, Sweden; Aug. 20-24, 2018 (7 pages).

Office Action in the counterpart Chinese Application No. 201880098922.7, mailed Jul. 20, 2023 (17 pages).

3GPP TSG RAN WG1 Meeting #94bis; R1-1811381 "Maintenance for NR random access" NTT Docomo, Inc.; Chengdu, China; Oct. 8-12, 2018 (5 pages).

3GPP TSG RAN WG1 Meeting #94bis; R1-1811356 "Maintenance for Downlink signals and channels" NTT Docomo, Inc.; Chengdu, China; Oct. 8-12, 2018 (9 pages).

3GPP TSG RAN WG1 Meeting #94; R1-1809141 "Maintenance for physical downlink control channel" NTT Docomo, Inc.; Gothenburg, Sweden; Aug. 20-24, 2018 (27 pages).

3GPP TSG RAN WG1 Meeting #94; R1-1809135 "Maintenance for NR random access" NTT Docomo, Inc.; Gothenburg, Sweden; Aug. 20-24, 2018 (16 pages).

Extended European Search Report issued in European Application No. 18939051.1, dated May 20, 2022 (8 pages).

Office Action in counterpart Indian Patent Application No. 202117022159 issued on Jan. 17, 2023 (7 pages).

\* cited by examiner

USER APPARATUS AND BASE STATION APPARATUS

TECHNICAL FIELD

The present invention relates to a user apparatus and a base station apparatus in a radio communication system.

BACKGROUND ART

As a required condition in NR (New Radio) (also referred to as "5G"), a successor system to Long Term Evolution (LTE), a technology that satisfies large-capacity systems, high-speed data transmission speeds, low delays, simultaneous connections of multiple terminals, low cost, power saving, or the like, is discussed (for example, Non-Patent Document 1).

The NR uses a higher frequency band than in LTE. Since a propagation loss increases in a high frequency band, in order to compensate for the propagation loss, it is discussed to apply beam forming to cause a narrow beam width in the radio signal so that the received power is improved (for example, Non-Patent Document 2).

BACKGROUND TECHNIQUE DOCUMENT

[Non-Patent Literature]

[NPL 1] 3GPP TS 38.300 V15.3.0 (2018 September)
[NPL 2] 3GPP TS 38.211 V15.3.0 (2018 September)

SUMMARY OF THE INVENTION

Problem to be Solved by the Invention

In the radio communication system of NR, a control signal associated with the beam is transmitted from the base station apparatus to a user apparatus. When the user apparatus performs monitoring of the control signal, there are cases where the assumed QCL (quasi co-located) of the control signal is not appropriate.

The present invention is made in view of the foregoing and is intended to appropriately monitor a control signal transmitted by the user apparatus from the base station apparatus in a radio communication system.

Means for Solving Problems

According to the disclosed technology, there is provided a user apparatus including a control unit configured to determine a spatial reception parameter of a control channel based on QCL (Quasi-co-location) information pertaining to a synchronization signal or a reference signal, and a receiver configured to receive the control channel based on the determined spatial reception parameter, wherein, in a case where a first search space is received during a non-contention based random access procedure, the control unit determines the spatial reception parameter of the first search space based on the QCL information applied when receiving an instruction (indication) by the control channel, the instruction triggering the non-contention based random access procedure.

Effect of the Invention

According to the disclosed technique, in a radio communication system, a control signal transmitted by a user apparatus from a base station apparatus can be appropriately monitored.

MODES OF CARRYING OUT THE INVENTION

Figure 1:
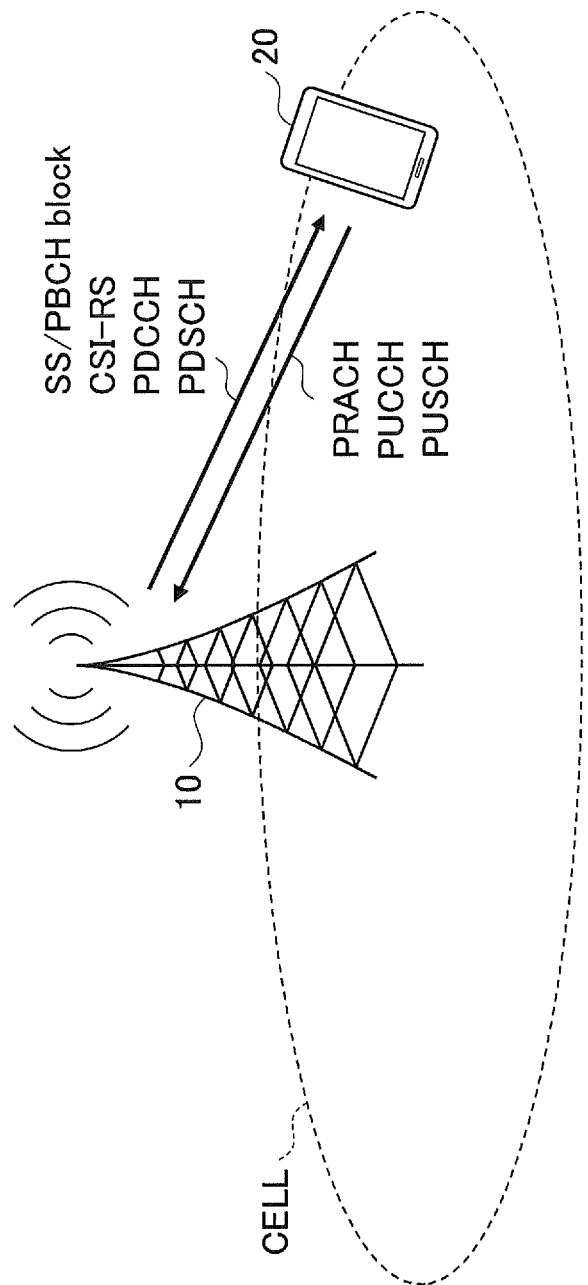
FIG. 1 is a diagram illustrating a radio communication system according to an embodiment of the present invention.

Hereinafter, the embodiment of the present invention will be described with reference to the figures.

The embodiment described below is exemplary, and the embodiment to which the present invention is applied is not limited to the following embodiment.

In the operation of the radio communication system of the embodiment of the present invention, existing technique is appropriately used. However, the existing technique is, for example, an existing LTE, but is not limited to the existing LTE. Also, the terminology "LTE" used below, unless otherwise stated, has a broad meaning that includes LTE-Advanced and a method (e.g., NR) subsequent to LTE-Advanced.

In addition, the embodiment of the present invention described below uses terminologies such as SS (Synchronization Signal), PSS (Primary SS), SSS (Secondary SS), PBCH (Physical Broadcast channel), PRACH (Physical Random Access channel), and the like, which are used in existing LTEs. This is for convenience of description, and similar signals, functions, etc. may be referred to as other names. The above-described terminologies in NR correspond to NR-SS, NR-PSS, NR-SSS, NR-PBCH, NR-PRACH, and the like.

However, even if the signal is used for NR, it is not always described as "NR-".

In the embodiment of the present invention, a duplex method may be a TDD (Time Division Duplex) method, FDD (Frequency Division Duplex) method, or any other method (e.g., Flexible Duplex, etc.).

Also, in the following description, the method of transmitting a signal using a transmission beam may be digital beam forming, in which a signal multiplied by a precoding vector (precoded by a precoding vector) is transmitted, or analog beam forming, in which beam forming is achieved using a variable phase shifter in an RF (Radio Frequency) circuit.

Similarly, the method of receiving a signal using the reception beam may be digital beam forming which multiplies the signal received by a predetermined weight vector, or analog beam forming which achieves beam forming using a variable phase controller in the RF circuit.

Hybrid beam forming combining digital beam forming and analog beam forming may be applied to transmit and/or receive. Transmitting a signal using a transmission beam may also be transmitting a signal at a particular antenna port.

Similarly, receiving a signal using a reception beam may be receiving a signal at a particular antenna port. An antenna port is a logical antenna port or physical antenna port defined in the 3GPP standard. The precoding or beam forming may also be referred to as a precoder or spatial domain filter or the like.

The method of forming the transmission and reception beams is not limited to the above method. For example, in the base station apparatus 10 or the user apparatus 20 both including multiple antennas, a method for varying the angle of each antenna may be used, a method for using precoding vectors and a method for varying the angle of the antenna may be used, a method for switching different antenna panels may be used, a method for combining methods using multiple antenna panels may be used, or other methods may be used.

Also, for example, multiple different transmission beams may be used in the high frequency band.

The use of multiple transmission beams is called a multibeam operation, and the use of a single transmission beam is called a single beam operation.

Also, in the embodiment of the present invention, the terminology "configure" may mean that a predetermined value is pre-configured, or a radio parameter indicated by the base station apparatus 10 or the user apparatus 20 is configured.

FIG. 1 is a diagram illustrating a radio communication system according to the embodiment of the present invention. The radio communication system in the embodiment of the present invention includes the base station apparatus 10 and the user apparatus 20, as illustrated in FIG. 1. In FIG. 1, one base station apparatus 10 and one user apparatus 20 are illustrated. However, this is exemplary and they respectively may be multiple.

The base station apparatus 10 is a communication apparatus that provides one or more cells and performs radio communications with the user apparatus 20. The physical resources of the radio signal may be defined by a time domain and a frequency domain, the time domain may be defined by the number of OFDM symbols, and frequency domains may be defined by the number of sub-carriers or the number of resource blocks. The base station apparatus 10 transmits a synchronization signal and system information to the user apparatus 20. The synchronization signal is, for example, NR-PSS and NR-SSS. A part of the system information is transmitted, for example, by NR-PBCH and is also referred to as broadcast information.

The synchronization signal and the broadcast information may be periodically transmitted as an SS block (SS/PBCH block) formed by a predetermined number of OFDM symbols. For example, the base station apparatus 10 transmits the control signal or data to the user apparatus 20 with a DL (Downlink) and receives the control signal or data with a UL (Uplink) from the user apparatus 20. Both the base station apparatus 10 and the user apparatus 20 can perform beam forming to transmit and receive the signals.

For example, as illustrated in FIG. 1, the reference signal transmitted from the base station apparatus 10 includes a CSI-RS (Channel State Information Registration Signal), and the channel transmitted from the base station apparatus 10 includes a PDCCH (Physical Downlink Control Channel) and a PDSCH (Physical Downlink Shared Channel).

The user apparatus 20 is a communication device with a wireless communication function such as a smartphone, a cellular phone, a tablet, a wearable terminal, and a communication module for Machine-to-Machine (M2M). The user apparatus 20 utilizes various communication services provided by the radio communication system by receiving control signals or data from the base station apparatus 10 with DL and transmitting control signals or data with UL to the base station apparatus 10.

For example, as illustrated in FIG. 1, a channel transmitted from the user apparatus 20 includes PUCCH (Physical Uplink Control Channel) and PUSCH (Physical Uplink Shared Channel).

In the NR, an antenna port is defined for being able to estimate a channel through which a symbol is transmitted in the antenna port, from a channel through which other symbols are transmitted in its antenna port. When the two antenna ports are QCL (quasi co-located), it is possible to estimate the propagation path characteristics of the other antenna port from the propagation path characteristics of one antenna port for propagation path characteristics including, for example, a delay spread, a Doppler spread, a Doppler shift, an average gain, an average delay or a spatial reception parameter.

Multiple types are defined for QCL. A QCL type A relates to a Doppler shift, Doppler spread, mean delay, and delay rate. A QCL type B relates to a Doppler shift and Doppler spread. A QCL type C relates to a Doppler shift and mean delay. The QCL type D relates to a spatial Rx parameter.

For example, if an SS block and a CSI-RS are QCL type D, the user apparatus 20 may apply and receive the same reception beam forming assuming that the SS block and the CSI-RS are transmitted from the base station apparatus 10 with the same DL beam. In the following description, "QCL" denotes any one of "QCL type A", "QCL type B", "QCL type C", and "QCL type D", or any combination thereof, if the type is not specified.

Figure 2:
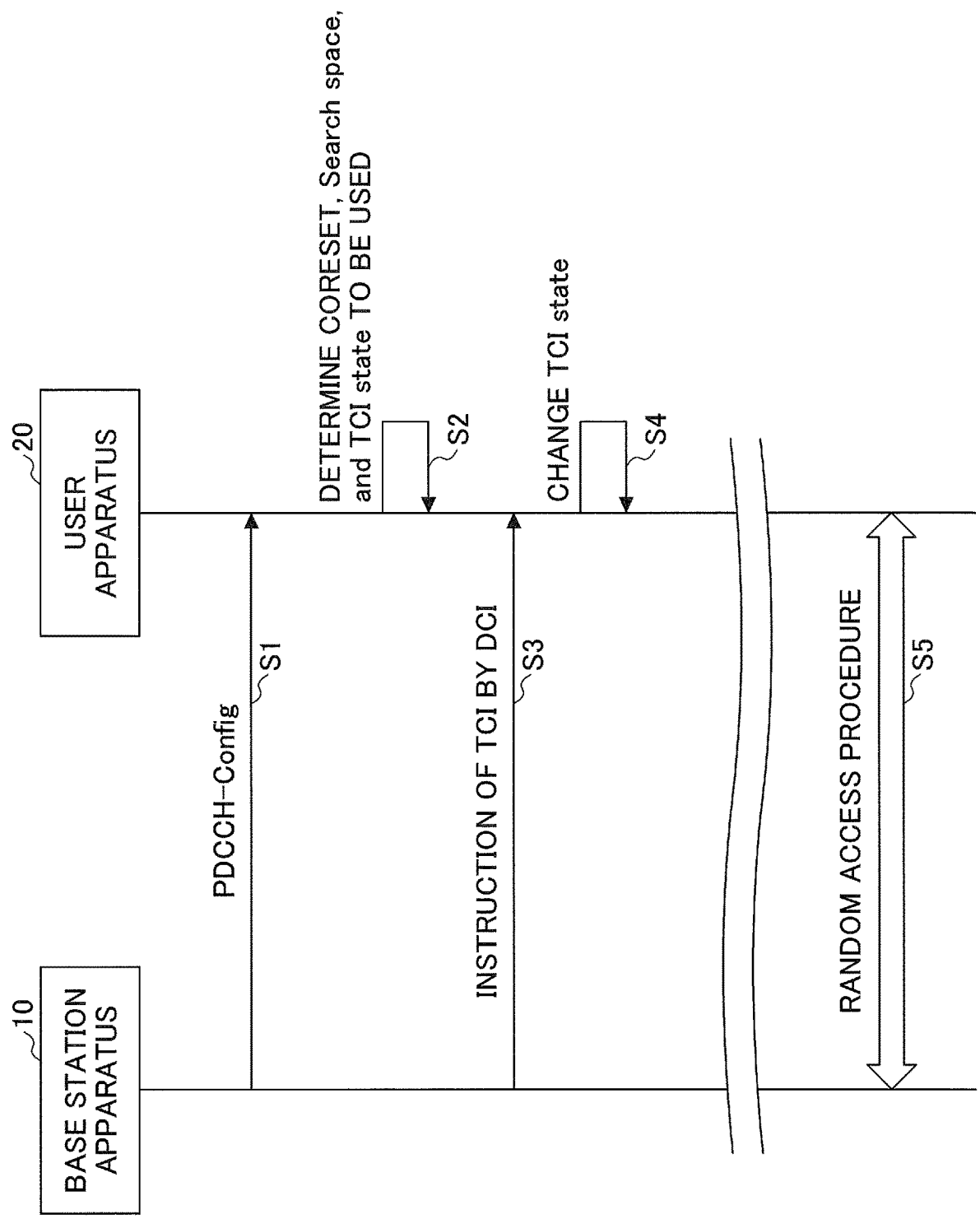
FIG. 2 is a diagram illustrating an example in which a TCI state is configured in the embodiment of the present invention.

FIG. 2 is a diagram illustrating an example in which a TCI state is configured according to the embodiment of the present invention. In the NR, the TCI (Transmission Configuration Indicator) state is defined. The TCI state indicates the QCL relation of the DL reference signal, and one or more TCI states are included in the RRC (Radio Resource Control) signaling that configures the control resource set (CORESET: Control resource set). The DL reference signal is an SS block or CSI-RS. That is, a control resource set applies any TCI state and determines the DL reference signal corresponding to the TCI state.

In step S1, the base station apparatus 10 transmits PDCCH-Config to the user apparatus 20 via RRC signaling. The PDCCH-Config includes information for the user apparatus 20 to receive the PDCCH and may be indicated to the user apparatus 20 as broadcast information or indicated to the user apparatus 20 by other RRC signaling. PDCCH-Config contains information defining a control resource set and information defining a search space.

In step S2, the user apparatus 20 determines the control resource set, search space, and TCI state to be used based on the PDCCH-Config received in step S1. The user apparatus 20 monitors control information in a determined search space.

In step S3, if the PDCCH-Config contains information indicating that the TCI state is indicated by the DCI, the base station apparatus 10 may dynamically indicate, to the user apparatus 20, the TCI state by the DCI, which is a PHY layer signaling. Subsequently, the user apparatus 20 changes to the indicated TCI state (S4).

Steps S3 and S4 may not be performed.

In step S5, a random access procedure is performed by the base station apparatus 10 and the user apparatus 20. The user apparatus 20 assumes QCL based on the selected SS block or CSI-RS to transmit PRACH and monitors control information. Either of steps S1-S4 or step S5 may be performed first.

Here, the search space for monitoring the control signal is associated with a control resource set. The RRC signaling that configures the search space indicates, to the user apparatus 20, the association between the search space and the control resource set. The user apparatus 20 monitors the control signal corresponding to the control resource set in the search space. If at least one TCI state is configured by the RRC signaling, the TCI state may be dynamically switched by the DCI (Downlink Control Information).

One type of the search space is the ra-SearchSpace or Type1 PDCCH CSS (Common search space) set used in the random access procedure. When monitoring the PDCCH and the corresponding PDSCH of Msg2 or Msg4 in the Type1 PDCCH CSS set, the assumption of QCL is of QCL for the SS blocks or CSI-RS assumed upon receipt of the PDCCH order in the case of non-contention based random access triggered by the PDCCH order.

Random access other than non-contention based random access triggered by the PDCCH order assumes QCL for SS blocks or CSI-RS selected by the user apparatus 20 for PRACH transmission when monitoring the PDCCH of Msg2 or Msg4 and the corresponding PDSCH in the Type1 PDCCH CSS set.

In addition, one type of the search space is Searchspace #0 for receiving RMSI (Remaining Minimum System Information) including the system information required to perform communication, OSI (Other System Information), paging, or the like. Searchspace #0 specifies the timing of monitoring for each of the SS blocks transmitted from the base station apparatus 10. That is, in Searchspace #0, unlike other Searchspace, the timing of monitoring for each SS block is different.

Figure 3:
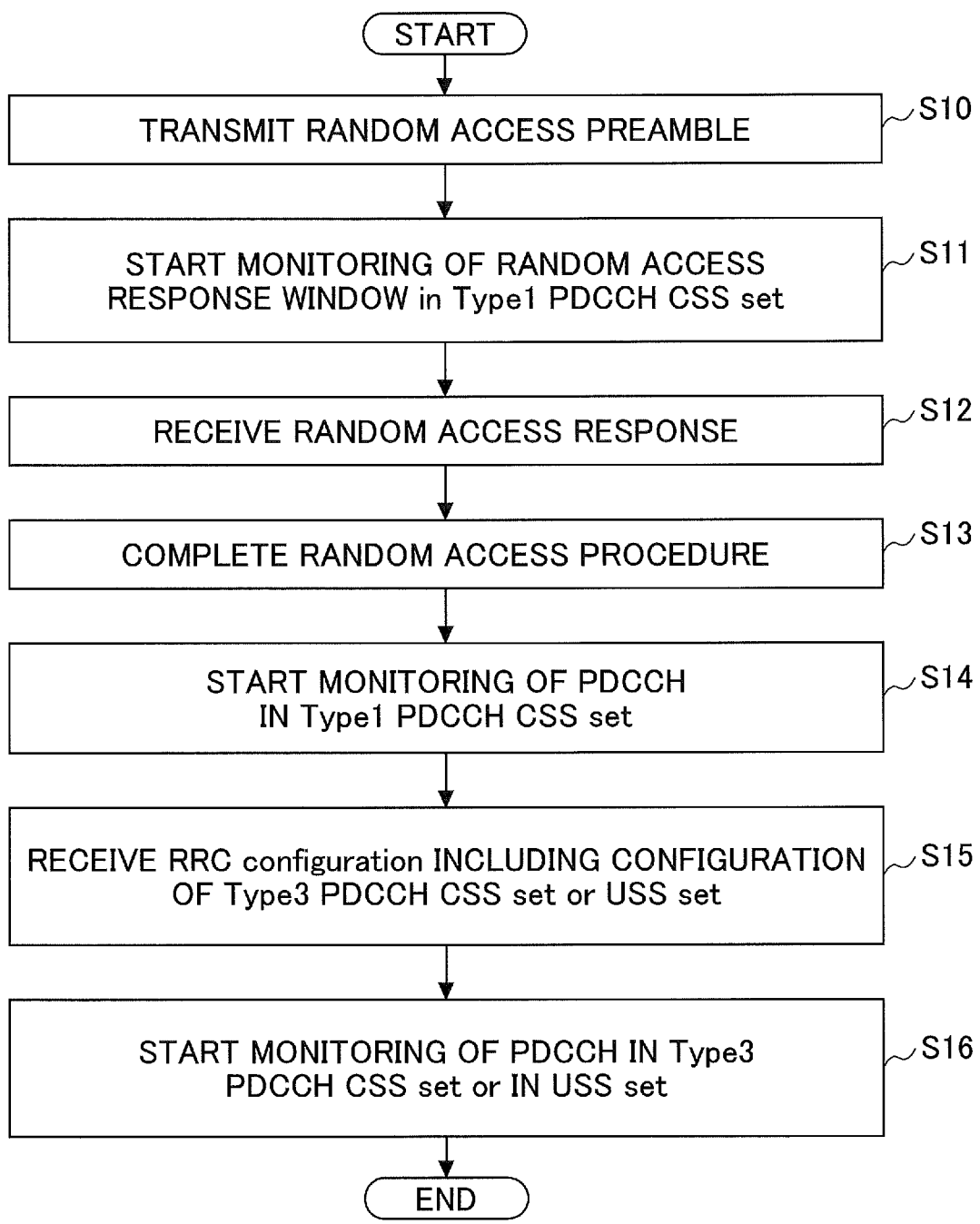
FIG. 3 is a flow chart illustrating an example (1) for monitoring a control signal in the embodiment of the present invention.

FIG. 3 is a flow chart illustrating an example (1) for monitoring a control signal in the embodiment of the present invention. The user apparatus 20 monitors the PDCCH of Msg2 or Msg4 in the Type1 PDCCH CSS set. Thereafter, the Type1 PDCCH CSS set may then be used if the user apparatus 20 has not received a configuration of the Type3 PDCCH CSS set or the USS (UE specific search space) set. That is, the Type1 PDCCH CSS set is used to monitor PDCCH until the user apparatus 20 receives the RRC configuration, including the configuration of the Type3 PDCCH CSS set or USS set.

Here, the user apparatus 20 not receiving the configuration of the Type3 PDCCH CSS set or the USS set, includes either case or both cases from among the case where the configuration of the Type3 PDCCH CSS set or the USS set has not been received from the base station apparatus 10 after the RRC connection, and the case where the configuration of the Type3 PDCCH CSS set or the USS set has not been received from the base station apparatus 10 after the random access has been initiated.

Further, the "random access", in the above-described case where the configuration of the Type3 PDCCH CSS set or the USS set has not been received from the base station apparatus 10 after the random access has been initiated, includes either case or both cases from among the case of corresponding to only random access other than the non-contention based random access triggered by the PDCCH order and the case of corresponding to all random accesses. Hereinafter, "when the configuration of Type3 PDCCH CSS set or USS set is not received from the base station apparatus 10" corresponds to any one of the cases described above.

The operation of the above user apparatus 20 will be described in the flow chart of FIG. 3 corresponding to the non-contention based random access.

In step S10, the user apparatus 20 transmits a random access preamble. Subsequently, the user apparatus 20 starts monitoring of the random access response window in the Type1 PDCCH CSS set (S11). The random access response is Msg2. Subsequently, the user apparatus 20 receives a random access response (S12) and completes the random access procedure (S13).

In step S14, the user apparatus 20 initiates monitoring of the PDCCH in the Type1 PDCCH CSS set. Here, when the user apparatus 20 performs monitoring in the Type1 PDCCH CSS set, there are cases where the QCL assumption is not specified.

Accordingly, until the RRC configuration including the configuration of Type3 PDCCH CSS set or USS set is received, when performing monitoring in Type1 PDCCH CSS set, the user apparatus 20 may always assume QCL for the SS block or CSI-RS selected by the user apparatus 20 or may assume the QCL assumed at the time of receiving the PDCCH order. Also, the TCI state configured to the corresponding CORESET may be ignored until an RRC configuration including the configuration of Type3 PDCCH CSS set or USS set is received.

As another example, until the TCI state of the corresponding CORESET is configured to the user apparatus 20, the user apparatus 20 may assume QCL for the selected SS block or CSI-RS when monitoring the corresponding Searchspace or may assume the QCL assumed when receiving the PDCCH order. That is, after the TCI state of the corresponding CORESET is configured to the user apparatus 20, the configured TCI state may be used by the user apparatus 20 as QCL assumption.

In any of the above examples, the QCL relation with the PDCCH order is assumed in the case of non-contention based random access triggered by the PDCCH order, and random access other than non-contention based random access triggered by the PDCCH order, such as collision random access or handover, assumes the QCL relation with the SS block or CSI-RS selected by the user apparatus 20. For example, the QCL relation may be assumed for the reception of PDCCH of Msg2 or Msg4 and the corresponding PDSCH, PDCCH triggering Msg3 retransmission, PDCCH after Msg4 and the corresponding PDSCH, and the like.

In step S15, RRC configuration including the configuration of Type3 PDCCH CSS set or USS set is received (S15), and monitoring of PDCCH is started in Type3 PDCCH CSS set or USS set (S16).

Figure 4:
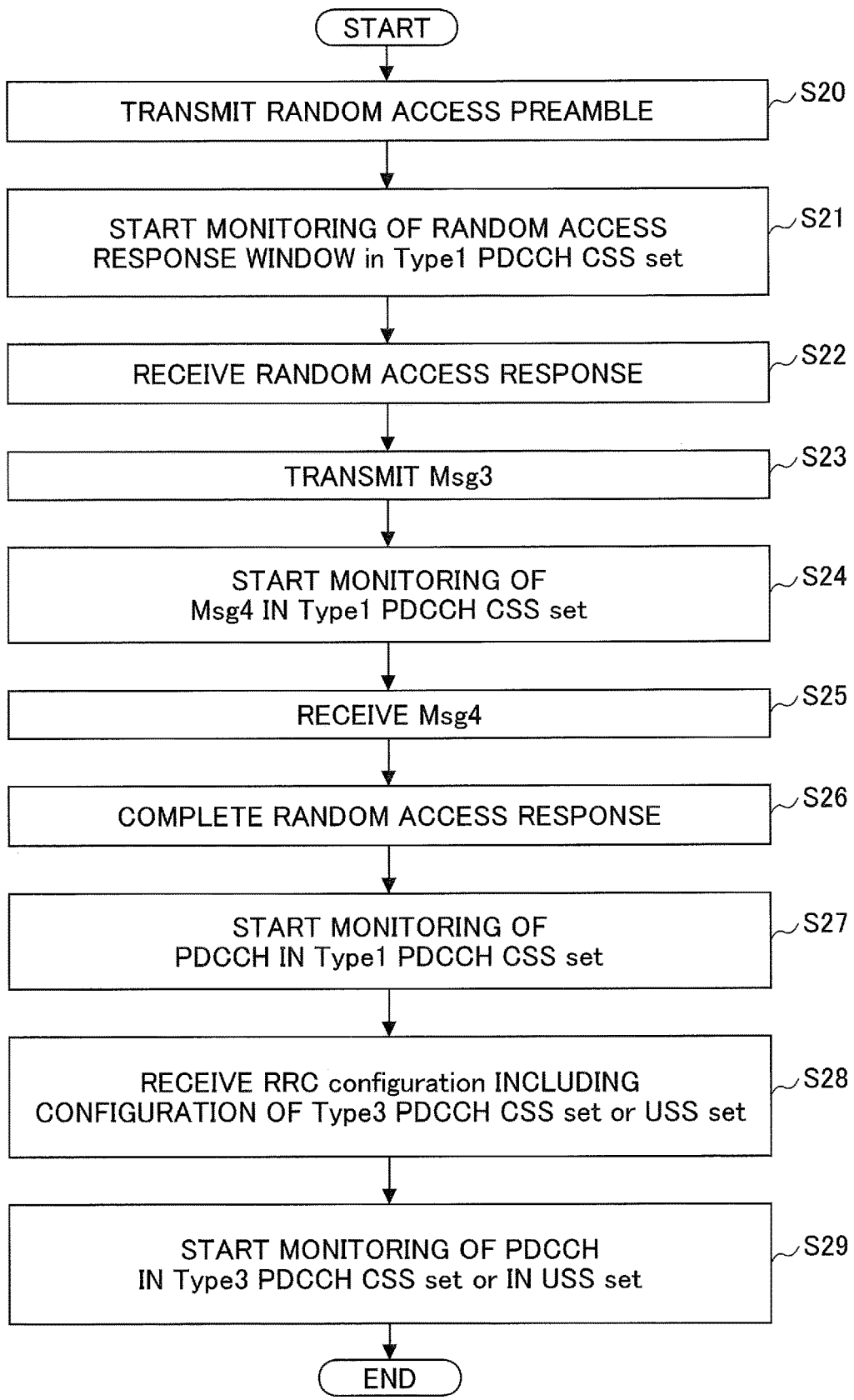
FIG. 4 is a flow chart illustrating an example (2) for monitoring the control signal in the embodiment of the present invention.

FIG. 4 is a flow chart illustrating an example (2) for monitoring the control signal in the embodiment of the present invention. The flow chart of FIG. 4 corresponding to contention-based type random access will illustrate the difference in operation with the user apparatus 20 illustrated in FIG. 3. Steps S20 to S22 illustrated in FIG. 4 are similar to steps S10 to S12 illustrated in FIG. 3. Steps S27 to S29 illustrated in FIG. 4 are similar to Steps S14 to S16 illustrated in FIG. 3.

A different step from FIG. 3 is step S23 to step S26 as illustrated in FIG. 4. In step S23, the user apparatus 20 transmits Msg3. Subsequently, the user apparatus 20 starts monitoring of Msg4 in the Type1 PDCCH CSS set (S24). Subsequently, the user apparatus 20 receives Msg4 (S25) and completes the random access procedure (S26).

It is hereby defined that, when the user apparatus 20 selects SSB or CSI-RS such as in contention-based random access or handover, after the selection, when the PDCCH or the corresponding PDSCH, which is monitored by the user apparatus 20 using the Type1 PDCCH CSS set, overlaps with another PDCCH, in a case where the other PDCCH is not in a QCL type D relation with the SSB or CSI-RS, monitoring need not be performed. The other PDCCH is, for example, a PDCCH for which Type 0/0A/2/3 PDCCH CSS set or USS set is monitored.

In other words, monitoring by Type1 PDCCH CSS set takes precedence. On the other hand, in the case of the non-contention based random access by the PDCCH order, a similar provision is not made.

Accordingly, in the case of non-contention based random access triggered by the PDCCH order, when the PDCCH, for which the user apparatus 20 monitors the Type1 PDCCH CSS set, or corresponding PDSCH, overlaps with another PDCCH, the user apparatus 20 may not perform monitoring if the other PDCCH is not in a QCL type D relation with the PDCCH order. In other words, if the other PDCCH is not in QCL type D relation with the PDCCH, for which the Type1 PDCCH CSS set is monitored, and PDSCH, the user apparatus 20 may not be required to monitor the other PDCCH.

Hereinafter, the configuration of the PDCCH order in the non-contention based random access will be described.

The PDCCH order that triggers RACH is scrambled by the C-RNTI (Cell specific Radio Network Temporary Identifier) and can be received by the USS or CSS. After Msg1 (PRACH preamble) triggered by the PDCCH order is transmitted, PDCCH for receiving after Msg2 is monitored by only Type1 PDCCH CSS. That is, the search space that receives the PDCCH order may differ from the Type1 PDCCH CSS used for the reception of Msg2 and later. Therefore, CORESET that receives PDCCH orders and CORESET that is used for the reception of Msg2 and later may be different. This is because CORESET is configured for each search space.

Here, searchspace #0 cannot be properly monitored based on CSI-RS because monitoring opportunities are switched for each SS block. In addition, when CSI-RS is designated as QCL in the PDCCH order reception in the non-contention based random access and when SSB is designated as QCL in the CORESET associated with any searchspace that indicates important information such as paging, OSI, or RMSI, the monitoring of Type1 PDCCH CSS set takes precedence after random access is initiated so that paging, OSI, or RMSI may not be monitored.

Therefore, it may be mandatory for SS blocks to be specified as QCL type D as the configuration of the TCI state of CORESET to which the PDCCH order is sent. Alternatively, the user apparatus 20 may assume that SSB is specified as the QCL type D as the configuration of the TCI state of the CORESET to which the PDCCH order is transmitted. In addition, other reference signals such as CSI-RS may be designated when other than QCL type D is designated.

The operation in which an SS block is designated or assumed to be required as a QCL type D as the TCI state of the CORESET, to which the PDCCH order is sent, may only be applied if any search space, such as paging, OSI, RMSI, or the like is associated with searchspace #0. Alternatively, an operation that is designated as or is assumed to be an SS block as the QCL type D as a config of the TCI state of the CORESET, to which the PDCCH order is transmitted, may be applied only if the TCI state configured to CORESET associated with any search space, such as paging, OSI, or RMSI, or the like is a SS block.

Alternatively, the SS block may be designated as, assumed as, or requisite as the QCL type D as the config of the TCI state of the CORESET, to which the PDCCH order is transmitted, only when any search space such as paging, OSI, RMSI, or the like is associated with searchspace #0 and the TCI state configured to CORESET associated with any service space such as paging, OSI, RMSI, or the like is the SS block.

The user apparatus 20 can simultaneously perform monitoring of other CSS, such as paging, OSI, or RMSI, because the operation of specifying or requiring SS blocks as QCL type D is such that SS blocks are used as QCL type D when monitoring Type1 PDCCH CSS during a random access procedure as a config of the CORESET TCI state to which the PDCCH order is transmitted.

In accordance with the above embodiment, the user apparatus 20 may monitor the PDCCH search space during a random access procedure and after the completion of the random access procedure while assuming an appropriate QCL.

In other words, in the radio communication system, monitoring of the control signal transmitted from the base station apparatus can be appropriately performed by the user apparatus.

(Apparatus Structure)

Described next is an example of a functional structure of the base station apparatus 10 and the user apparatus 20 that execute the process and operation described above. The base station apparatus 10 and user apparatus 20 include the function of implementing the above embodiment. However, each of the base station apparatus 10 and the user apparatus 20 may include only a part of the function of the embodiment.

<Base Station Apparatus 10>

Figure 5:
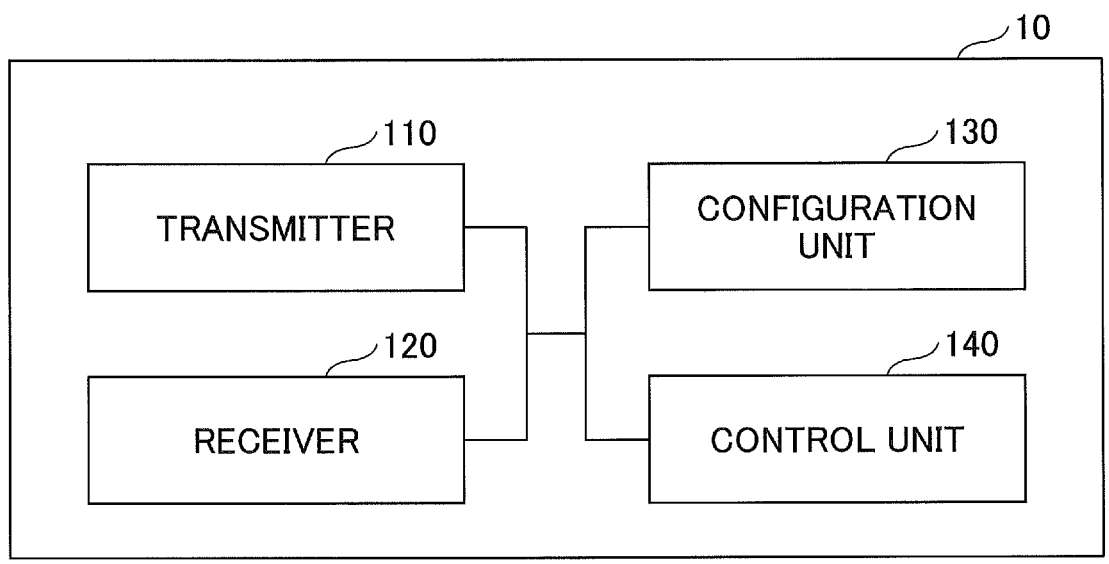
FIG. 5 is a diagram illustrating an example of a functional structure of a base station apparatus 10 according to the embodiment of the present invention.

FIG. 5 is a diagram illustrating an example of the functional structure of the base station apparatus 10. As illustrated in FIG. 5, the base station apparatus 10 includes a transmitter 110, a receiver 120, a configuration unit 130, and a control unit 140. The functional structure illustrated in FIG. 5 is only one example. If the operation according to the embodiment of the present invention can be performed, the names of a functional category and a functional part may be any.

The transmitter 110 has a function of generating a signal to be transmitted to the user apparatus 20 and transmitting the signal wirelessly. The receiver 120 has a function for receiving various signals transmitted from the user apparatus 20 and acquiring information of a higher layer, for example, from the received signal. The transmitter 110 has a function of transmitting NR-PSS, NR-SSS, NR-PBCH, DL/UL control signals, etc. to the user apparatus 20.

The configuration unit 130 stores the preset configuration information and various configuration information transmitted to the user apparatus 20 in the memory device and reads out the configuration information from the memory device as needed.

The contents of the configuration information include, for example, control information of the user apparatus 20, information pertaining to random access, or the like.

The control unit 140 performs a process of generating control information to be transmitted to the user apparatus as described in the embodiment. The control unit 140 controls the random access procedure with the user apparatus 20. A function unit for transmitting signals in the control unit 140 may be included in the transmitter 110, and a function unit for receiving signals in the control unit 140 may be included in the receiver 120.

<User Apparatus 20>

Figure 6:
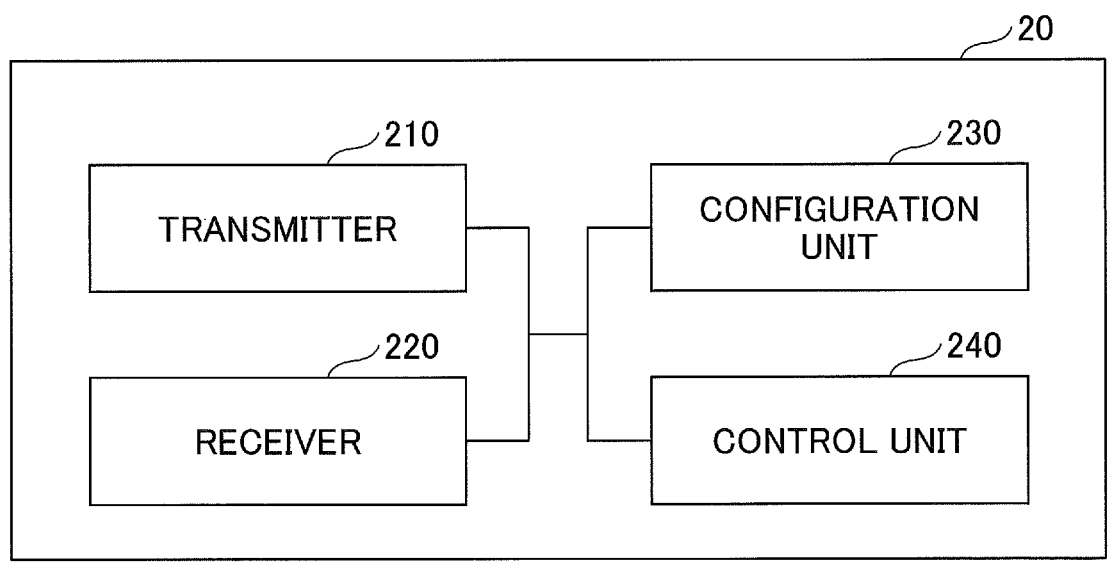
FIG. 6 is a diagram illustrating an example of a functional structure of a user apparatus 20 according to the embodiment of the present invention.

FIG. 6 is a diagram illustrating an example of a functional structure of the user apparatus 20. As illustrated in FIG. 6, the user apparatus 20 includes a transmitter 210, a receiver 220, a configuration unit 230, and a control unit 240. The functional structure illustrated in FIG. 6 is only one example. The functional category and the name of the functional part may be any as long as the operation according to the embodiment of the present invention can be performed.

The transmitter 210 generates a transmission signal from the transmission data and transmits the transmission signal wirelessly. The receiver 220 receives various signals wirelessly and acquires a signal on a higher layer from the received signal on the physical layer. The receiver 220 has a function to receive NR-PSS, NR-SS, NR-PBCH, DL/UL/SL control signals, etc. transmitted from the base station apparatus 10. For example, the transmitter 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel) and the like to another user apparatus 20 as a D2D communication, and the receiver 120 receives PSCCH, PSSCH, PSDCH, or PSBCH from another user apparatus 20.

The configuration unit 230 stores various configuration information received from the base station apparatus 10 or the user apparatus 20 in the storage device by the receiver 220, and reads out the configuration information from the memory device as needed. The configuration unit 230 also stores preset configuration information that is preset. The contents of the configuration information include, for example, control information of the user apparatus 20 and information pertaining to a random access.

The control unit 240 performs monitoring of the control signal based on the control information obtained from the base station apparatus 10 as described in the embodiment. The control unit 240 also controls the random access procedure with the base station apparatus 10. A function unit for transmitting signals in the control unit 240 may be included in the transmitter 210, and a function unit for receiving signals in the control unit 240 may be included in the receiver 220.

(Hardware Structure)

Block diagrams (FIGS. 5 and 6) used in the above embodiment illustrate blocks of functional units. These functional blocks (components) are implemented by any arbitrary combination of hardware and/or software. Further, the method of implementing each functional block is not particularly limited. That is, each functional block may be implemented using one device that is physically or logically coupled, or two or more devices that are physically or logically separated may be connected directly or indirectly (e.g., using a wired communication, a wireless communication, etc.) so as to implement each functional block. The functional blocks may be implemented by one or more of the above devices in combination with software.

Functions include, but are not limited to, judgment, determination, determination, calculation, calculation, processing, derivation, investigation, discovery, confirmation, reception, transmission, output, access, access, resolution, selection, establishment, comparison, assumption, expectation, discovery, notification, communication, forwarding, configuring, reconfiguring, assigning, mapping, and assignment. For example, a functional block (component) that functions to transmit is called a transmitting unit or a transmitter. None of these are particularly limited in their implementation as described above.

Figure 7:
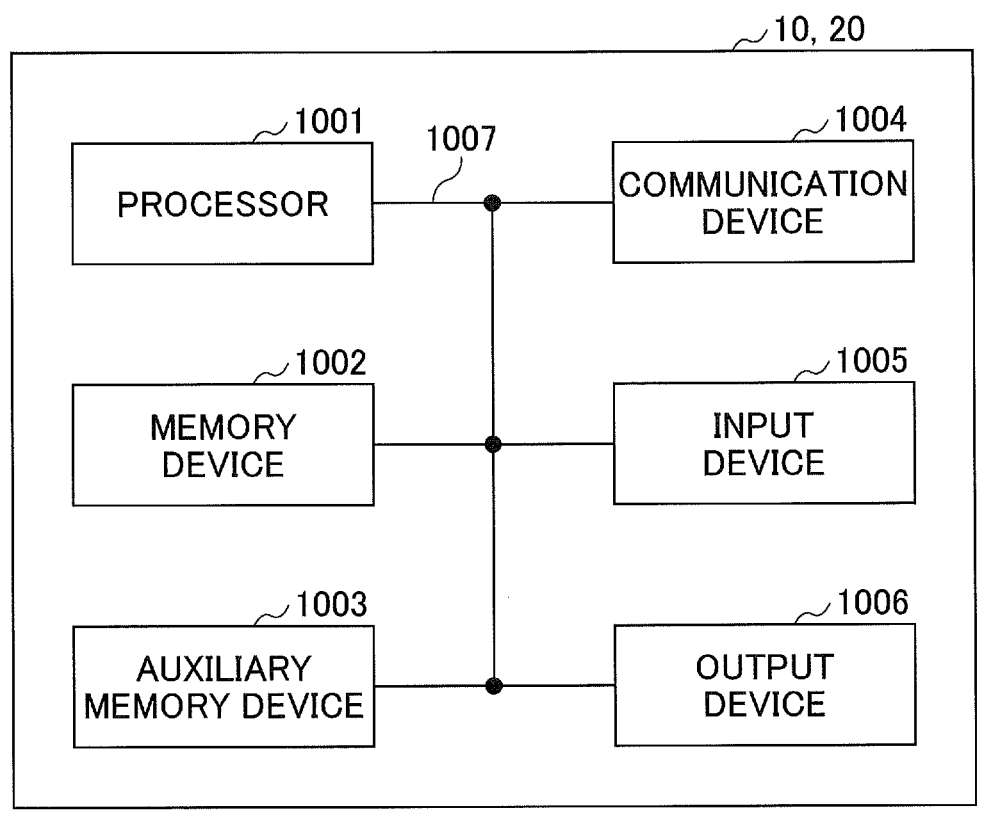
FIG. 7 is a diagram illustrating an example of a hardware structure of the base station apparatus 10 or the user apparatus 20 according to the embodiment of the present invention.

For example, the base station apparatus 10, the user apparatus 20, or the like in the embodiment of the present disclosure may function as a computer for processing the wireless communication method of the present disclosure. FIG. 7 is a diagram illustrating an example of the hardware structure of the base station apparatus 10 and the user apparatus 20 according to the embodiment of the present disclosure. The base station apparatus 10 and user apparatus 20 described above may be physically configured as a computer apparatus including a processor 1001, a memory device 1002, an auxiliary memory device 1003, a communication device 1004, an input device 1005, an output device 1006, a bus 1007, and the like.

In the following description, the terminology "apparatus" can be read as a circuit, device, unit, etc. The hardware structure of the base station apparatus 10 and the user apparatus 20 may be configured to include one or more of the devices illustrated in the figure or may be configured without including a part of the apparatuses.

Each function in the base station apparatus 10 and the user apparatus 20 is substantialized by having the processor 1001 read predetermined software (a program) on hardware such as the memory device 1002 so as to perform the operation by the processor 1001 to control communication by the communication device 1004 or to control at least one of reading and writing data in the memory device 1002 and the auxiliary memory device 1003.

The processor 1001, for example, operates an operating system to control the entire computer. The processor 1001 may be a central processing unit (CPU) including interfaces with peripheral devices, a control device, an operation device, a register, and the like. For example, the above control unit 140, the above control unit 240, or the like may be implemented by the processor 1001.

The processor 1001 also reads a program (a program code), a software module, data, and so on from at least one of the auxiliary memory device 1003 and the communication device 1004 to the memory device 1002 and performs various processes in accordance therewith. As a program, a program that causes a computer to execute at least a portion of the operation described in the above-described embodiment is used. For example, the control unit 140 of the base station apparatus 10 illustrated in FIG. 5 may be implemented by a control program stored in the memory device 1002 and operated by the processor 1001.

For example, the control unit 240 of the user apparatus 20 illustrated in FIG. 6 may be implemented by a control program stored in the memory device 1002 and operated by the processor 1001. While the various processes described above have been described as being executed by one processor 1001, they may be executed simultaneously or sequentially by two or more processors 1001. The processor

1001 may be implemented by one or more chips. The program may be transmitted from the network via a telecommunications line.

The memory device 1002 is a computer readable storage medium, and may be comprised of at least one of, for example, a ROM (Read Only Memory), an EPROM (Erasable Programmable ROM), an EEPROM (Electrically Erasable Programmable ROM), a RAM (Random Access Memory), or the like. The memory device 1002 may be called a register, a cache, a main memory (a main memory device), or the like. The memory device 1002 may store a program (a program code), a software modules, or the like that is executable to implement the communication method according to the embodiment of the present disclosure.

The auxiliary memory device 1003 is a computer readable storage medium and may comprise, for example, at least one of an optical disk such as a CD-ROM (Compact Disc ROM), a hard disk drive, a flexible disk, an optical magnetic disk (e.g., a compact disk, a digital versatile disk, a Blu-ray ("Blu-ray" is the registered trademark) disk, a smart card, a flash memory (e.g., a card, a stick, and a key drive), a floppy ("floppy" is the registered trademark) disk, a magnetic strip, and the like. The auxiliary memory device 1003 may be called an auxiliary memory device.

The memory medium described above may be, for example, a database, a server, or other suitable medium including at least one of the memory device 1002 and the auxiliary memory device 1003.

The communication device 1004 is hardware (transceiver device) for communicating between computers via at least one of a wired network and a wireless network, and is also referred to, for example, as a network device, a network controller, a network card, a communication module, and the like. The communication device 1004 may include, for example, a high frequency switch, a duplexer, a filter, a frequency synthesizer, or the like to implement at least one of a frequency division duplex (FDD) and a time division duplex (TDD), for example. For example, a transmitting/receiving antenna, an amplifier, a transceiver, a transmission line interface, or the like may be implemented by the communication device 1004. The transceiver may be implemented by physically or logically separating into the transmitter and the receiver.

The input device 1005 is an input device (e.g., a keyboard, a mouse, a microphone, a switch, a button, a sensor, or the like) that receives an external input from the outside. The output device 1006 is an output device (e.g., a display, speaker, LED lamp, etc.) that performs outgoing output. The input device 1005 and the output device 1006 may be of an integrated structure (e.g., a touch panel).

Each device, such as the processor 1001 and the memory device 1002, is also connected by the bus 1007 for communicating information. The bus 1007 may be configured using a single bus or may be configured using different buses between devices.

The base station apparatus 10 and the user apparatus 20 may also include hardware such as a microprocessor, a digital signal processor (DSP), an ASIC (Application Specified Circuit), a PLD (Programmable Logic Device), and a FPGA (Field Programmable Gate Array), wherein the hardware may implement a part or all of the functional blocks. For example, the processor 1001 may be implemented using at least one of the above hardware.

Summary of Embodiment

As described above, according to the embodiment of the present invention, there is provided a user apparatus that includes a control unit configured to determine a spatial reception parameter of a control channel based on QCL (Quasi-co-location) information pertaining to a synchronization signal or a reference signal; and a receiver configured to receive the control channel based on the determined spatial reception parameter, wherein, in a case where a first search space is received during a non-contention based random access procedure, the control unit determines the spatial reception parameter of the first search space based on the QCL information applied when receiving an instruction by the control channel, the instruction triggering the non-contention based random access procedure.

With the above structure, the user apparatus 20 can monitor the PDCCH search space in a random access procedure assuming the appropriate QCL.

That is, in a radio communication system, monitoring of the control signal transmitted by the user apparatus from the base station apparatus can be appropriately performed.

The receiver may not monitor a second search space if, during a non-contention based random access procedure, the second search space is overlapping with the first search space and the QCL information pertaining to the second search space is different from the QCL information applied upon receipt of an indication by the control channel triggered by the non-contention based random access procedure. With this structure, the user apparatus 20 can perform monitoring during a random access procedure for PDCCH based on QCL information of the PDCCH order.

The control unit may assume that the QCL information applied when receiving an instruction by the control channel triggering the non-contention based random access procedure is QCL information pertaining to the synchronization signal. With this structure, the user apparatus 20 can monitor Searchspace #0 based on the QCL information of the PDCCH order during a random access procedure.

The control unit may assume that the QCL information applied when receiving an instruction by the control channel triggering the non-contention based random access procedure is QCL information pertaining to the synchronization signal only when the QCL information pertaining to the third search space is QCL information pertaining to the synchronization signal. The structure allows the user apparatus 20 to monitor Searchspace #0 associated with the QCL information pertaining to the synchronization signal based on the QCL information of the PDCCH order.

Further, according to the embodiment of the present invention, there is provided a base station apparatus that includes a control unit configured to determine a spatial transmission parameter of a control channel based on QCL (Quasi-co-location) information pertaining to a synchronization signal or a reference signal; and a transmitter configured to transmit the control channel based on the determined spatial transmission parameter, wherein, in a case where a first search space is transmitted during a non-contention based random access procedure, the control unit determines the spatial reception parameter of the first search space based on the QCL information applied when transmitting an instruction by the control channel, the instruction triggering the non-contention based random access procedure.

With the above structure, the user apparatus 20 can monitor the PDCCH search space in a random access procedure assuming the appropriate QCL.

In other words, in the radio communication system, the user apparatus can appropriately monitor the control signal transmitted from the base station apparatus.

Supplement to Embodiment

While the embodiment of the present invention has been described above, the disclosed invention is not limited to the embodiment. Those skilled in the art will understand various modifications, revisions, alternatives, substitutions, and the like. Descriptions have been made using specific numerical examples to facilitate understanding of the invention. Unless otherwise indicated, these values are merely examples and any suitable value may be used.

Classification of the items in the above description is not essential to the present invention, and the items described in two or more items may be used in combination as needed, or the items described in one item may be applied (unless inconsistent) to the items described in another item.

The boundaries of functional parts or processing parts in the functional block diagram do not necessarily correspond to the boundaries of physical parts.

The operation of the multiple functional parts may be physically performed on one part or the operation of one functional part may be physically performed by multiple parts.

For the processing procedures described in the embodiment, the order of processing may be changed as long as there is no inconsistency.

For the convenience of explaining the process, the base station apparatus 10 and the user apparatus 20 have been described using the functional block diagrams. The base station apparatus 10 and the user apparatus 20 may be implemented by hardware, software, or a combination thereof.

Software operated by the processor included in base station apparatus 10 in accordance with the embodiment of the present invention and software operated by the processor included in the user apparatus 20 in accordance with the embodiment of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable memory medium, respectively.

The indication of information is not limited to the mode or the embodiment described above. The indication may be performed using other methods. For example, the indication of the information may be performed by physical layer signaling (e.g., DCI (Downlink Control Information), UCI (Uplink Control Information)), higher layer signaling (e.g., RRC (Radio Resource Control) signaling, MAC (Medium Access Control) signaling, broadcast information (MIB (Master Information Block), SIB (System Information Block)), other signals, or combinations thereof. The RRC signaling may also be called an RRC message, for example, an RRC connection setup message, an RRC connection reconfiguration (RRC Connection Connection) message, or the like.

The mode and the embodiment described in this disclosure is LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA ("W-CDMA" is the registered trademark), GSM ("GSM" is registered trademark), CDMA2000, UMB (Ultra Mobile Broadband), IEEE 802.11 (Wi-Fi) ("Wi-Fi" is the registered trademark), IEEE 802.16 (WiMAX) ("WiMAX" is the registered trademark), IEEE 802.20, UWB (Ultra-WideBand), Bluetooth ("Wi-Fi" is the registered trademark), it may be applied to at least one of a system utilizing other suitable systems and a next generation system extended based on the above system. Multiple systems may also be combined and applied (e.g., combinations of at least one of LTE and LTE-A with 5G, etc.).

The processing procedures, sequences, flow charts, or the like of the mode and the embodiment described herein may be reordered unless inconsistency occurs.

For example, the method described in the present disclosure presents elements of various steps using an exemplary order is not limited to the particular order presented.

The specific operation described herein as being performed by the base station apparatus 10 may be performed by the upper node depending on a case. It is apparent that in a network formed by one or more network nodes having the base station apparatus 10, various operations performed for communication with the user apparatus 20 may be performed by at least one of the base station apparatus 10 and other network nodes (for example, presumably MME, S-GW, or the like, but not limited to these) other than the base station apparatus 10. Although a case where the other network node other than the base station apparatus 10 is one is exemplified, the other network nodes may be a combination of multiple other network nodes (e.g., MME and S-GW).

The information, the signals, and so on described in this disclosure may be output from a higher layer (or a lower layer) to a lower layer (or an upper layer). The information, the signals, and so on may be input and output through multiple network nodes.

The input and output information may be stored in a specific location (e.g., memory) or managed using a management table. Information to be input or output may be overwritten, updated, or added. The output information or the like may be deleted. The input information or the like may be transmitted to other devices.

The determination in the present disclosure may be made using whether a value can be expressed in 1 bit (0 or 1), using a true value (Boolean: true or false), or using a numerical comparison (e.g., comparison with a predetermined value).

The software is broadly interpreted to mean a command, a command set, a code, a code segment, a program code, a program, a sub-program, a software module, an application, a software application, a software package, a routine, a subroutine, an object, an executable file, a thread, a procedure, a function, and the like, regardless of whether the software is called software, firmware, middleware, a microcode, a hardware description language, or any other name.

The software, the command, the information, and so on may also be transmitted and received via a transmission medium. For example, if the software is transmitted from a web site, server, or other remote source using at least one of a wired technology (coaxial cable, optical fiber cable, twisted pair, digital subscriber line (DSL: Digital Subscriber Line, etc.) and a wireless technology (infrared, microwave, etc.), at least one of these wired technology and wireless technology is included in the definition of a transmission medium.

The information, signals, and the like described in the present disclosure may be represented using any of a variety of different techniques. For example, the data, the instruction, the command, the information, the signal, the bit, the symbol, the chip, and the like, which may be referred to throughout the above description, may be represented by a voltage, a current, an electromagnetic wave, a magnetic field, a magnetic particle, an optical field, or a photon, or any combination thereof.

The terminology described in this disclosure and that necessary for understanding this disclosure may be replaced by a terminology having the same or similar meaning. For example, at least one of the channels and symbols may be a signal (signaling). The signal may also be a message. Component carriers (CC) may also be referred to as carrier frequencies, cells, frequency carriers, and the like.

The terminologies "system" and "network" as used in this disclosure are used interchangeably.

Also, the information, parameters, etc. described in the present disclosure may be represented using absolute values, may be represented using relative values from predetermined values, or may be represented using corresponding other information. For example, a wireless resource may be one indicated by an index.

The name used in the above parameter is not limiting in any respect. Furthermore, mathematical equations using these parameters may differ from those explicitly disclosed in the present disclosure. Since various channels (e.g., PUCCH, PDCCH, etc.) and information elements can be identified by any suitable name, the various names assigned to these various channels and information elements are not limiting in any respect.

In the present disclosure, terminologies such as "base station (BS)", "radio base station", "base station apparatus", "fixed station", "NodeB", "eNodeB(eNB)", "gNodeB(gNB)", "access point", "transmission point", "reception point", "transmission/reception point", "cell", "sector", "cell", "cell group", "carrier", and "component carrier" may be used interchangeably, and base stations may occasionally called terminologies such as macro cell, small cells, Femtocell, Pico cell, and the like.

The base station may accommodate one or more (e.g., three) cells. If the base station accommodates multiple cells, the entire coverage area of the base station may be divided into multiple smaller areas, each smaller area may also provide communications services by a base station subsystem (e.g., RH: Remote Radio Head), the terminology "cell" or "sector" indicate a part or all of the coverage area of at least one of the base stations and base station subsystems providing communications services in this coverage.

In the present disclosure, terminologies such as "mobile station (MS: Mobile Station)", "user terminal", "user apparatus (UE: User Equipment)", and "terminal" may be used interchangeably.

The mobile station may be called by one of ordinary skill in the art a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a remote terminal, a handset, a user agent, a mobile client, "client", or any other suitable term.

At least one of the base station and the mobile station may be called a transmission apparatus, a receipt apparatus, a communication apparatus, or the like. At least one of the base station and the mobile station may be a device mounted on a mobile body, the mobile itself, or the like. The mobile may be a carrier (e.g., an automobile, an airplane, etc.), an unmanned mobile (e.g., a drawn, an automated vehicle, etc.), or a robot (a manned or unmanned type).

At least one of the base station and the mobile station includes an apparatus that does not necessarily move during a communication operation. For example, at least one of the base station and the mobile station may be an IoT (Internet of Things) apparatus such as a sensor.

In addition, the base station in the present disclosure may be replaced with a user terminal. For example, each aspect/embodiment of the present disclosure may be applied to a structure in which communication between a base station and a user terminal is replaced by communication between a plurality of user apparatuses 20 (e.g., referred to as D2D (Device-to-Device), V2X (Vehicle-to-Everything), or the like. In this case, the function performed by the above base station apparatus 10 may be substantialized by the structure of the user apparatus 20. In addition, the words "up" and "down" may be replaced by the words corresponding to the communication between terminals (for example, "side"). For example, up and down channels may be replaced by side channels.

Similarly, the user terminal in the present disclosure may be replaced by the base station. In this case, the function provided by the user terminal described above may be performed by the structure of the base station.

The terminologies "determining" and "determining" as used in this disclosure may encompass a wide variety of operations. "Decision" and "determination" may include, for example, judging, calculating, computing, processing, deriving, investigating, searching (looking up, search, inquiry: for example, exploring in a table, a database or another data structure), confirming, or ascertaining is regarded to be decided or determined. "Decision" or "determination" may include, for example, receiving (e.g., receiving information), transmitting (e.g., transmitting information), input, output, or access (accessing, e.g., accessing data in memory) is regarded to be "decided" or "determined".

"Decision" and "determination" may include, for example, resolving, selecting, choosing, establish, establishment (establishing), or comparing, and the like.

In other words, "judgment" and "decision" may include that any action is regarded to be "decided" or "determined".

"Decision" may be replaced with "assuming", "expecting", "determining", or the like.

The terminologies "connected", "coupled", or all variations thereof means all direct or indirect connection or coupling between two or more elements and may mean a presence of one or more intermediate elements between the two elements "connected" or "coupled" to each other. The coupling or connection between elements may be physical, logical, or a combination of these. For example, "connection" may be replaced with "access". In the present disclosure, the two elements may be considered to be "connected" or "coupled" each other using at least one of one or more wires, cables, and printed electrical connections, or using, as a non-limiting and non-comprehensive example, electromagnetic energy having a wavelength of a radio frequency domain, a microwave domain, light (both visible and invisible), or the like.

The reference signal may be abbreviated as an RS (Reference Signal) and may be called a pilot by the standard to be applied.

"Based on" as used in this disclosure does not mean "based solely on" unless otherwise specified. In other words, "based on" means both "based solely on" and "based at least on".

No reference to an element using a designation such as "first" or "second" as used in this disclosure generally limit the amount or order of those elements. These designations may be used in the present disclosure as a convenient way to distinguish between two or more elements. Accordingly, references to the first and second elements do not imply that only two elements can be adopted or that in some way the first element precedes the second element.

The "means" in the structure of each of the above-described devices may be replaced by "parts," "circuits," "devices," and the like.

It is intended that, where the terminologies "include", "include" and variations thereof are used in the present disclosure, these terminologies are as comprehensive as the terminologies "comprising". Further, it is intended that the terminology "or" as used in this disclosure is not an exclusive OR.

A radio frame may consist of one or more frames in the time domain. In the time domain, one or more frames may be called a sub-frame. The sub-frame may further be formed by one or more slots in the time domain.

The sub-frame may be a fixed time length (e.g., 1 ms) independent of numerology.

The numerology may be a communication parameter that is applied to a signal or at least one of the transmission and reception in a channel. The numerology may indicate, for example, at least one of a subcarrier spacing (SCS), a bandwidth, a symbol length, a cyclic prefix length, a transmission time interval (TTI), the number of symbols per TTI, a radio frame structure, a specific filtering processing performed by the transceiver in the frequency domain, a particular windowing processing performed by the transceiver in the time domain, and the like.

The slots may consist of one or more symbols (OFDM (Orthogonal Frequency Division Multiplexing) symbols, SC-FDMA (Single Carrier Frequency Division Multiple Access) symbols, etc.) in the time domain. The slots may be a time unit based on numerology.

The slot may include multiple mini slots. Each mini slot may consist of one or more symbols in the time domain. The mini slot may also be called a subslot. The mini slot may consist of fewer symbols than that of the slot. The PDSCH (or PUSCH) transmitted in a time unit greater than the mini slot may be called a PDSCH (or PUSCH) mapping type A. The PDSCH (or PUSCH) transmitted using the mini slot may be called a PDSCH (or PUSCH) mapping type B.

All the radio frame, sub-frame, slot, mini slot, and symbol represent time units for transmitting signals. The radio frame, sub-frame, slot, mini slot, and symbol may be respectively called by different designations.

For example, one sub-frame may be called a transmission time interval (TTI), multiple consecutive sub-frames may also be called a TTI, and one slot or one mini-slot may also be called a TTI. That is, at least one of the sub-frame and the TTI may corresponds to a sub-frame (1 ms) in an existing LTE, a period shorter than 1 ms (e.g., 1-13 symbols), or a period longer than 1 ms.

The unit representing the TTI may be called the slot, the mini slot, or the like, rather than the sub-frame.

Here, the TTI refers to, for example, the minimum time unit for scheduling in the radio communication. For example, in the LTE system, the base station conducts scheduling for each user apparatus 20 so as to allocate radio resources (such as a frequency bandwidth, transmit power, etc. that can be used in each user apparatus 20) in a unit of the TTI. The definition of the TTI is not limited to this.

The TTI may be a transmission time unit, such as a channel encoded data packet (a transport block), a code block, a code word, or the like, or may be a processing unit, such as scheduling, a link adaptation, or the like. When the TTI is provided, the time interval (e.g., the number of symbols) in which the transport block, code block, code word, or the like is actually mapped may be shorter than the TTI.

If one slot or one mini slot is called the TTI, one or more TTIs (i.e., one or more slots or one or more mini slots) may be the minimum time unit for the scheduling.

Also, the number of slots (the number of mini slots) forming the minimum time unit of the scheduling may be controlled.

TTIs having a time length of 1 ms may normally be called an ordinary TTI (TTI in LTE Rel.8-12), a normal TTI, a long TTI, an ordinary sub-frame, a normal sub-frame, a long sub-frame, a slot, and the like. A TTI that is usually shorter than the ordinary TTI may be called a shortened TTI, a short TTI, a partial or fractional TTI, a shortened sub-frame, a short sub-frame, a mini slot, a sub-slot, a slot, or the like.

The long TTI (e.g., the ordinary TTI, the sub-frame, etc.) may be replaced with a TTI having a long time exceeding 1 ms, or the short TTI (e.g., the shortened TTI) may be replaced with a TTI having a TTI length less than the TTI length of a long TTI and a TTI length of 1 ms or longer.

The resource block (RB) is a unit in allocating the resource such as the time domain and frequency domain and may include one or more consecutive subcarriers in the frequency domain. The number of subcarriers included in the RB may be the same regardless of the numerology, for example 12. The number of subcarriers included in the RB may be determined based on the numerology.

The time domain of the RB may also include one or more symbols, which may be one slot, one mini slot, one sub-frame, or the length of 1TTI. Each of the 1TTI, 1 sub-frame, and the like may be formed by one or more resource blocks.

The one or more RBs may be called physical resource blocks (PRB: Physical RB), sub-carrier groups (SCG: Sub-Carrier Group), resource element groups (REG: Resource Element Group), PRB pairs, RB pairs, and the like.

The resource block may also consist of one or more resource elements (RE: Resource Element). For example, the 1RE may be a radio resource region of 1 subcarrier and 1 symbol.

The bandwidth part (BWP: which may also be called a partial bandwidth, etc.) may represent a subset of consecutive common resource blocks (RB) for the numerology in a certain carrier. Here, the common RB may be identified by the index of the RB that uses the common reference point of the carrier as a reference. The PRB may be defined by a certain BWP and may be numbered in the BWP.

BWP may include BWP (UL BWP) for UL and BWP (DL BWP) for DL. For a UE, one or more BWPs may be configured in one carrier.

At least one of the configured BWPs may be active, and the UE may not assume sending or receiving a predetermined signal/channel outside the active BWP. In addition, the terminologies "cell" and "carrier" in this disclosure may be replaced with "BWP".

The radio frame, sub-frame, slot, mini slot and symbols described above are merely exemplified. For example, the number of sub-frames contained in the radio frame, the number of slots per the sub-frame or radio frame, the number of mini-slots contained in the slots, the number of sub-carriers contained in the RB, and the number of symbols in the TTI, the symbol length, the length of a cyclic prefix (CP: Cyclic Prefix), and the like can be variously changed.

In the present disclosure, if an article is added by translation, such as a, an, and the in the English language, the present disclosure mean that the nouns following these articles are plural.

In this disclosure, an expression of "A and B are different" may mean that "A and B are different from each other." The expression may mean that "A and B are different from C, respectively." Terminologies such as "leave" or "joint" may be interpreted in a way similar to "different."

Each of the embodiments/embodiments described in the present disclosure may be used alone, in combination, or switched upon implementation. Notice of predetermined information (e.g., "X") may also be given by implication (e.g., no notice of the predetermined information) rather than explicitly.

In this disclosure, the QCL type D is an example of the QCL information. The SS block or CSI-RS is an example of the synchronization signal or reference signal.

The PDCCH order is an example of the instruction by the control channel. The type1 PDCCH CSS set is an example of the first search space. The type0/0A/2/3 PDCCH CSS set or USS set is an example of the second search space. The type 0 PDCCH CSS set or Searchspace #0 is an example of the third search space.

Although the present disclosure has been described in detail, it will be apparent to those skilled in the art that the disclosure is not limited to the embodiment described herein. This disclosure may be implemented as a modification and a changed mode without departing from the spirit and scope of the present disclosure as defined by the appended claims.

Accordingly, the description of the present disclosure is intended for illustrative purposes and does not have any limiting significance to the disclosure.

EXPLANATION OF NUMERICAL REFERENCE

10 Base station apparatus
110 Transmitter
120 Receiver
130 Configuration unit
140 Control unit
20 User apparatus
210 Transmitter
220 Receiver
230 Configuration unit
240 Control unit
1001 Processor
1002 Memory device
1003 Auxiliary memory device
1004 Communication device
1005 Input device
1006 Output device

The invention claimed is:

1. A terminal comprising:
a receiving unit that receives information indicating one or more Transmission Configuration Indicator (TCI) states, wherein the information is used to configure a control resource set; and
a control unit that assumes, using a TCI state configured based on the information indicating the TCI states, a Quasi-Co-Location (QCL) of a control channel in the control resource set, wherein
the control unit assumes, based on a Synchronization Signal/Physical Broadcast Channel (SS/PBCH) block selected in a random access procedure, the QCL of the control channel in the control resource set until the TCI state is configured based on the information indicating the TCI states, and
the information is received after the random access procedure completes directly after receiving a msg2.

2. The terminal according to claim 1, wherein the receiving unit receives the information used to configure the control resource set by Radio Resource Control (RRC) signaling.

3. A base station comprising:
a transmitting unit that transmits, to a terminal, information indicating one or more Transmission Configuration Indicator (TCI) states, wherein the information is used to configure a control resource set to the terminal, wherein
the terminal assumes, using a TCI state configured based on the information indicating the TCI states, a Quasi-Co-Location (QCL) of a control channel in the control resource set,
the terminal assumes, based on a Synchronization Signal/Physical Broadcast Channel (SS/PBCH) block selected in a random access procedure, the QCL of the control channel in the control resource set until the TCI state is configured based on the information indicating the TCI states, and
the information is received after the random access procedure completes directly after receiving a msg2.

4. A communication system comprising:
a base station that transmits information indicating one or more Transmission Configuration Indicator (TCI) states, wherein the information is used to configure a control resource set; and
a terminal that:
receives the information indicating the TCI states from the base station; and
assumes, using a TCI state configured based on the information indicating the TCI states, a Quasi-Co-Location (QCL) of a control channel in the control resource set, wherein
the terminal assumes, based on a Synchronization Signal/Physical Broadcast Channel (SS/PBCH) block selected in a random access procedure, the QCL of the control channel in the control resource set until the TCI state is configured based on the information indicating the TCI states, and
the information is received after the random access procedure completes directly after receiving a msg2.

5. A communication method performed by a terminal, the communication method comprising:
receiving information indicating one or more Transmission Configuration Indicator (TCI) states, wherein the information is used to configure a control resource set;
assuming, using a TCI state configured based on the information indicating the TCI states, a Quasi-Co-Location (QCL) of a control channel in the control resource set,
wherein the terminal assumes, based on a Synchronization Signal/Physical Broadcast Channel (SS/PBCH) block selected in a random access procedure, the QCL of the control channel in the control resource set until the TCI state is configured based on the information indicating the TCI states; and
receiving the information after the random access procedure completes directly after receiving a msg2.

* * * * *